United States Patent Office 3,542,565
Patented Nov. 24, 1970

3,542,565
MAYONNAISE STABILIZED WITH PEANUT LIPOPROTEIN
Clyde E. Stauffer, Springfield Township, Hamilton County, Ohio, assignor to The Procter & Gamble Company, Cincinnati, Ohio, a corporation of Ohio
No Drawing. Filed Nov. 24, 1967, Ser. No. 685,296
Int. Cl. A23l 1/24
U.S. Cl. 99—144                                          3 Claims

ABSTRACT OF THE DISCLOSURE

Mayonnaise stabilized with peanut lipoprotein against emulsion thinning or breakdown due to mechanical shear.

BACKGROUND OF THE INVENTION

Mayonnaise is a thick, viscous, non-pourable food dressing. More specifically, it is an oil-in-water emulsion which utilizes egg yolk as the primary emulsifier. Due to the very high level of oil in mayonnaise, several problems are faced in its formulation, particularly in regard to physical stability of the emulsion.

Physically, mayonnaise consists of an internal or discontinuous phase of oil droplets dispersed in an external or continuous aqueous phase of acetic and/or citric acid, egg yolk, and minor ingredients. Mayonnaise products gradually become thinner with age, because the oil particles coalesce, and, if kept for a sufficient length of time, will eventually separate more or less completely into two separate phases. The emulsion will also be broken if it is subjected to temperatures low enough to cause extensive crystallization of the oil.

The emulsion stability of mayonnaise is discussed in U.S. Patent 3,027,260. Conventionally, use of the term "emulsion stability" as applied to mayonnaise actually refers to the stability of the emulsion to withstand low temperatures or freeze-thaw cycles. As noted above, it is well known that such conditions often cause the mayonnaise emulsion to break down. However, another problem facing formulators of mayonnaise is the propensity of the product to become thin (less viscous) or to break down when subjected to mechanical shock, i.e., when a jar or case of product is dropped or jolted during shipping or handling, or when the emulsion is subjected to other mechanical shear forces, e.g., by overmixing during processing.

Thus, the problem in the mayonnaise art to which the present invention is addressed is the thinning and/or separation of mayonnaise caused by mechanical shear forces such as shock, vibration, or mixing.

SUMMARY OF THE INVENTION

The present invention relates to egg yolk-emulsified mayonnaise which possesses superior resistance to thinning or breakdown caused by mechanical shear. More specifically, the present invention resides in the discovery that adding from about 0.25% to about 5% peanut lipoprotein to mayonnaise greatly increases the emulsion stability to mechanical shear. In essence then, this invention provides mayonnaise containing oil, water, egg yolk, and from about 0.25% to about 5% peanut lipoprotein.

DESCRIPTION OF THE PREFERRED EMBODIMENTS

Mayonnaise is the emulsified semi-solid (non-pourable) food dressing prepared from edible oil, water, an egg yolk-containing material, and generally, an acidifying ingredient. It preferably contains from about 60% to about 90% vegetable oil, from about 5% to about 15% water, from about 1% to about 10% egg yolk, and from about 0.1% to about 1% acid. Common additional ingredients in mayonnaise include salt, sugar, spices, e.g., mustard flour, and flavoring additives.

The vegetable oil used in mayonnaise can be any edible vegetable oil and is preferably a salad oil. Corn, sunflower, soybean and cottonseed oils are preferred. Refined and lightly hydrogenated soybean and/or cottonseed oils are highly preferred. The oil can be winterized and a crystal inhibitor, e.g., oxystearin, can be included.

A preferred amount of oil is from about 75% to about 85%. A preferred amount of water is from about 8% to about 12%.

The egg yolk ingredient in mayonnaise can be in the form of liquid egg yolks, frozen egg yolks, dried egg yolks, liquid whole eggs, frozen whole eggs, dried whole eggs or any of the foregoing combined with liquid egg white or frozen egg white. A sufficient amount of egg yolk-containing ingredients should be used to provide from about 1% to about 10%, preferably from about 6% to about 9%, egg yolk in the mayonnaise.

The acid ingredient can be any edible acid. Preferably, it is acetic, citric, or mixture of these acids. Acetic acid, e.g., in the form of vinegar, or citric acid, e.g., in the form of lemon or lime juice, are highly preferred. The acid source such as vinegar should be used in a sufficient amount to provide from about 0.1% to about 10%, preferably from about 0.3% to about 1% actual acid in the mayonnaise.

Additional ingredients in the mayonnaise can comprise: salt (preferably from about 0.5% to about 3%), e.g., sodium chloride; sugar (preferably from about 1% to about 4%), e.g., sucrose, dextrose, corn syrup, invert syrup, maltose, or honey; mustard (preferably from about 0.1% to about 2%), e.g., mustard flour; and additional spices, flavorings or preservatives, e.g., paprika, monosodium glutamate, or EDTA.

In addition to the above enumerated conventional ingredients, the mayonnaise compositions of this invention contain from about 0.25% to about 5%, preferably from about 0.5% to about 2%, and most preferably about 1%, peanut lipoprotein. As discussed in more detail hereinafter, addition of the peanut lipoprotein provides the mayonnaise emulsion with greatly increased stability to mechanical shear.

Peanut lipoprotein is a commercially available material processed from peanuts by an impulse rendering or cell rupturing technique. It is a protein-oil complex available as a bland, spray-dried powder. Peanut lipoprotein and methods of its manufacture are described in Food Processing, March 1963, pages 66, 67; Industrial Chemist 38, No. 449 (July 1962), page 376; and particularly in Food Technology (July 1963), page 107. An excellent disclosure on the preparation of peanut lipoprotein from ground peanuts is found in U.S. Patent 2,928,821. In essence, commercial peanut lipoprotein is prepared by transmitting mechanically generated shock waves through an alkaline medium to rupture the cells of ground peanuts and to release their constituents. The resultant liquor from the impulse generator is separated by high-speed centrifugation into three streams—a carbohydrate product, an oil emulsion, and peanut lipoprotein. Peanut lipoprotein is precipitated by acidification to a pH of about 4.9 and thickened to a paste by high-speed centrifugation. Subsequent processing involves neutralization to a pH of about 6.9 and spray drying to yield the commercial product.

The mayonnaise of this invention can be prepared in any conventional manner. See, for example, Food Engineering, February 1955, pages 583–91. The usual procedure in making mayonnaise is to combine the egg yolks, sugar, salt and spices with a minor portion of the vinegar or citric acid (e.g., 10%–45% of the total water and acid) in the bowl of a paddle mixer or vertical type batch mixer and mix at moderate to high speed. The oil is then added gradually with continued mixing at moderate to high speed and, when the emulsion is formed, the remaining major portion of the water and acid is blended into the emulsion with continued mixing. Often, the mixture is then passed through a high shear device such as a colloid mill, a texturating valve or an inline-type mixer to insure homogeneity and complete emulsion formation. However, care is always exercised with conventional mayonnaise to prevent excessive mixing or shear because this can, as noted previously, cause emulsion thinning and/or breakdown. In the present invention, the emulsion stability provided by the peanut lipoprotein additive greatly increases the tolerance of the mayonnaise to mixing or other high shear force and thus facilitates processing and/or enables an improved product to be prepared, e,g., more intensive high shear mixing can be applied to provide a product having superior homogeneity.

The mayonnaise of the present invention is preferably prepared in the manner outlined above which comprises: combining egg yolk, a minor portion of the water, and minors to form a "pre-mix"; gradually adding in the oil while mixing (preferably at moderate to high speed, e.g., 400–1000 r.p.m., in a paddle mixer) to form an emulsion; and blending the major portion of the water into the emulsion.

It is highly preferable to include the peanut lipoprotein additive in the pre-mix with the egg yolk and minor portion of water (at any time prior to addition of the oil). This results in distribution of the peanut lipoprotein in the aqueous phase (as contrasted to the oil phase) of the final mayonnaise product wherein its functionality in stabilizing the emulsion is enhanced. A second reason for preferentially including the peanut lipoprotein in the composition prior to addition of the oil is that more intensive mixing and shear can be utilized during the addition of oil and subsequent processing as noted above.

EXAMPLE

Mayonnaise was prepared by first mixing the following ingredients in the amounts specified at intermediate speed (450 r.p.m.) in a conventional household electric mixer to form a pre-mix:

| Ingredient: | Amount |
|---|---|
| Fresh liquid egg yolk | grams 32.0 |
| Sodium chloride | do 5.2 |
| Mustard flour | do 2.8 |
| Aqueous acetic acid (of a 4.1% solution) | ml 11 |
| Powdered sugar | grams 8 |
| Peanut lipoprotein (obtained under the name "Lipo" from Shulton Chemical Corp.) | grams 4 |

The mixer was turned up to high speed (875 r.p.m.) and 308 grams of a commercially available salad oil (refined, bleached and deodorized soybean oil hydrogenated to an I.V. of about 107) was gradually added to the pre-mix. A good emulsion was formed, and after about five minutes of mixing at high speed, an additional 33 ml. of 4.1% aqueous acetic acid was added with continued mixing at high speed. The mayonnaise thus formed was smooth and delectable. It had excellent physical characteristics, e.g., a yield point of about 3360 dyne-cm.

The mayonnaise had an extremely high resistance to mechanical shear as shown in the following described test.

The increased resistance to emulsion breakdown of the invention mayonnaise prepared in the above example was observed through the use of a Haake Rotovisco viscometer (supplied by Gebruder-Haake, Berlin, Germany). This instrument is a rotating viscometer in which the mayonnaise emulsion characteristics are measured by introducing the mayonnaise into the gap between a plate and a rotating cone. The rotating cone and plate arrangement imparts high mechanical shear to the mayonnaise, and the viscosity is determined from the measured resistance to rotation caused by the mayonnaise. The resistance (apparent viscosity) is continuously recorded and plotted against time.

The Rotovisco viscometer was operated at a different given speed for each of a series of experiments for the example mayonnaise and for a control mayonnaise (which was identical to the example except the peanut lipoprotein ingredient was omitted). The control mayonnaise underwent an increase in apparent viscosity up to a point at which the apparent viscosity was sharply lowered, indicating emulsion thinning or breakdown. The peanut lipoprotein-containing mayonnaise of the example underwent an increase in apparent viscosity in the same manner as the control but stayed at a high level indicating that the emulsion did not undergo thinning or breakdown. The example mayonnaise containing peanut lipoprotein will also exhibit increased emulsion stability to mechanical shear other than the specific type illustrated, e.g., the shear generated by: intensive mixing; a colloid mill; a texturating valve; an in-line mixer; or the mechanical shock generated by dropping a container of the mayonnaise.

The increased emulsion stability to mechanical shear achieved by the use of peanut lipoprotein in mayonnaise in accordance with this invention is particularly noteworthy since a commensurate increase in emulsion stability is not achieved by the use of additional egg yolk or by the use of egg yolk lipoprotein.

All percentages, proportions and ratios herein are by weight unless indicated otherwise.

What is claimed is:
1. Mayonnaise comprising from about 60% to about 90% vegetable oil, from about 5% to about 15% water, from about 1% to about 10% egg yolk, from about 0.1% to about 1.0% edible acid, and from about 0.5% to about 2% peanut lipoprotein.
2. The method of increasing the emulsion stability of mayonnaise containing oil, water, and egg yolk to mechanical shear, which comprises adding from about 0.25% to about 5% peanut lipoprotein to the mayonnaise.
3. The method of claim 2 which comprises adding the peanut lipoprotein to a pre-mix of egg yolk and a minor portion of water, and adding the oil and major portion of water subsequently.

References Cited

Waldt, L. M. et al., "Peanut Lipoprotein," Food Technology, July 1963, pp. 927–931.

Chem. Abstracts, vol. 60 6136(b), 1964.

MAURICE W GREENSTEIN, Primary Examiner

J. M. HUNTER, Assistant Examiner